(12) United States Patent
Kurachi et al.

(10) Patent No.: US 6,650,068 B2
(45) Date of Patent: Nov. 18, 2003

(54) INDUCTION COIL CORE, ILLUMINATION UNIT USING THE SAME, AND POLYCRYSTALLINE FERRITE

(75) Inventors: Toshiaki Kurachi, Osaka (JP); Koji Miyazaki, Osaka (JP); Katsushi Seki, Shiga (JP); Mamoru Takeda, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/796,794

(22) Filed: Mar. 2, 2001

(65) Prior Publication Data

US 2002/0036472 A1 Mar. 28, 2002

(30) Foreign Application Priority Data

Mar. 13, 2000 (JP) ........................................ 2000-068303

(51) Int. Cl.$^7$ ............................................... H05B 41/24
(52) U.S. Cl. ..................... 315/248; 315/344; 315/348; 313/484; 252/62.62
(58) Field of Search ................. 315/248, 344, 315/348; 252/62.62, 62.56; 313/484

(56) References Cited

U.S. PATENT DOCUMENTS

| | | | |
|---|---|---|---|
| 2,551,711 A | 5/1951 | Snoek et al. | |
| 4,473,542 A | 9/1984 | David | |
| 5,626,789 A | * 5/1997 | Varshney | ................. 252/62.62 |
| 6,057,649 A | * 5/2000 | Van Der Zaag et al. | .... 315/248 |
| 2002/0067129 A1 | 6/2002 | Chamberlain et al. | |

FOREIGN PATENT DOCUMENTS

| | | |
|---|---|---|
| EP | 0 624 886 A1 | 11/1994 |
| EP | 0 625 794 A1 | 11/1994 |
| GB | 1 344 132 | 1/1974 |
| GB | 1 583 260 | 1/1981 |
| JP | 06-349622 | 12/1994 |
| JP | 7-99042 | 4/1995 |
| JP | 07-099042 | 4/1995 |
| JP | 2000-182816 A | 6/2000 |
| JP | 2000-348683 A | 12/2000 |
| TW | 130551 | 3/1990 |

OTHER PUBLICATIONS

European Search Report, Dated Aug. 16, 2001.
*Notice of Reasons for Rejection*, Japanese Patent Office, Mailing Date Dec. 3, 2002.

* cited by examiner

Primary Examiner—David Vu
(74) Attorney, Agent, or Firm—Nixon Peabody LLP; Thomas W. Cole

(57) ABSTRACT

The induction coil core used for an induction coil of a discharge lamp, the discharge lamp including: a bulb containing discharge gas inside; and the induction coil for generating an electromagnetic field with a frequency in a range of 50 kHz to 1 MHz inclusive in the bulb. The core is made of a Mn—Zn polycrystalline ferrite and has a Curie temperature of 270° C. or more.

6 Claims, 6 Drawing Sheets

PRIOR ART

INDUCTION COIL CORE, ILLUMINATION UNIT USING THE SAME, AND POLYCRYSTALLINE FERRITE

BACKGROUND OF THE INVENTION

The present invention relates to a core for an induction coil, an illumination unit using the same, and a polycrystalline ferrite. More particularly, the present invention relates to a core for an induction coil used for a discharge lamp that generates an electromagnetic field inside a bulb, which contains discharge gas therein, by means of the induction coil.

FIG. 7 schematically illustrates a cross-sectional construction of an illumination unit that generates plasma discharge by means of an induction coil. The illustrated illumination unit includes: a translucent bulb 101 containing discharge gas such as inert gas and metal vapor inside; and an induction coil 102 placed in a cavity 108 formed in the center of the bulb 101. The induction coil 102 is essentially composed of a core (magnetic material) 102a and a winding 102b wound around the core 102a. The induction coil 102 is electrically connected to a high-frequency power supply circuit 103 for supplying high-frequency power via a matching circuit 104. The matching circuit 104 is provided to match the impedance between the induction coil 102 and the high-frequency power supply circuit 103 for efficient transfer of high-frequency power to the bulb 101. The high-frequency power supply circuit 103 and the matching circuit 104 are housed in a circuit case 105.

When a high-frequency current in the range of several megahertz to several hundred megahertz is applied to the induction coil 102 from the high-frequency power supply circuit 103, ring-shaped plasma discharge 106 is generated inside the bulb 101. Generation of the plasma discharge 106 causes emission of ultraviolet light or visible light, whereby light output is obtained. In practice, the oscillating frequency of the high-frequency power supply circuit 103 is 13.56 MHz or several megahertz in the ISM band.

An example of the core 102a suitably usable for the illumination unit described above is disclosed in Japanese Laid-Open Patent Publication No. 7-99042. The publication describes a core having a loss of 150 mW/cm$^3$ or less when measured at room temperature with a frequency of 3 MHz and a magnetic flux density of 10 mT, and discloses that Ni—Zn ferrite material is suitable as the material satisfying this condition.

When Ni—Zn ferrite material is used for the core 102a, it is preferable to set the operating frequency of the high-frequency power supply circuit 103 at a high frequency of several megahertz (or in the range of several megahertz to several tens of megahertz) from the standpoint of the physical properties of the Ni—Zn ferrite material. In order to realize such high-frequency operation, however, a large-size noise filter is required to suppress line noise generated from the high-frequency power supply circuit 103. This disadvantageously increases the volume of the high-frequency power supply circuit 103. In other words, the illumination unit using the core 102a made of a Ni—Zn ferrite material has a problem that a large-size noise filter is additionally required and thus downsizing of the illumination unit is difficult.

Moreover, in the case where high-frequency noise is radiated or propagated from the unit, extremely strict regulations are imposed for prevention of the noise. In order to satisfy these regulations, therefore, an expensive noise filter must be used for the illumination unit. This poses a big barrier against attempt of cost reduction of the illumination unit.

SUMMARY OF THE INVENTION

An object of the present invention is providing an induction coil core operable in a comparatively low frequency range (50 kMz to 1 MHz inclusive) and an illumination unit using such a core.

Another object of the present invention is providing a polycrystalline ferrite usable as the material of the above induction coil core.

The induction coil core of the present invention is a core used for an induction coil of a discharge lamp, the discharge lamp including: a bulb containing discharge gas inside; and the induction coil for generating an electromagnetic field with a frequency in a range of 50 kHz to 1 MHz inclusive in the bulb, wherein the core is made of a Mn—Zn polycrystalline ferrite and has a Curie temperature of 270° C. or more.

In one embodiment, the Curie temperature is 290° C. or more.

In another embodiment, the Mn—Zn polycrystalline ferrite includes Fe, Mn, and Zn where Fe element occupies 72 wt. % or more of all elements excluding oxygen.

In still another embodiment, the Mn—Zn polycrystalline ferrite includes Fe, Mn, and Zn and also includes Ni as an additive.

In still another embodiment, the core has a characteristic of being able to receive a magnetomotive force of 600 ampere-turn or more under the conditions of room temperature, a frequency of 100 kHz in the electromagnetic field, and a cross-sectional area of a face of the core vertical to a direction of magnetic flux of 120 mm$^2$.

The illumination unit of the present invention includes: a bulb containing discharge gas inside; an induction coil for generating an electromagnetic field with a frequency in a range of 50 kHz to 1 MHz in the bulb; and a power supply for supplying power to the induction coil, wherein the induction coil includes a core and a winding, and the core is made of a Mn—Zn polycrystalline ferrite and has a Curie temperature of 270° C. or more.

In one embodiment, the Curie temperature is 290° C. or more.

In another embodiment, the induction coil has a characteristic of being able to receive a magnetomotive force of 600 ampere-turn or more under the conditions of room temperature, a frequency of 100 kHz in the electromagnetic field, and a cross-sectional area of a face of the coil vertical to a direction of magnetic flux of 120 mm$^2$.

In still another embodiment, the induction coil is placed in a cavity in the center of the bulb formed by deforming a portion of an outer wall of the bulb into a concave shape, a phosphor is applied to an inner wall of the bulb, and the discharge gas includes at least rare gas.

In still another embodiment, the illumination unit is a self-ballasted fluorescent lamp.

The polycrystalline ferrite of the present invention includes Fe, Mn, and Zn where Fe element occupies 72 wt. % or more of all elements excluding oxygen, the ferrite having a Curie temperature of 270° C. or more.

Alternatively, the polycrystalline ferrite of the present invention includes Fe, Mn, and Zn and also including Ni as an additive, the ferrite having a Curie temperature of 270° C. or more.

In one embodiment, Fe element occupies 60 wt. % or more of all elements excluding oxygen.

DESCRIPTION OF THE PREFERRED EMBODIMENTS

Figure 8:
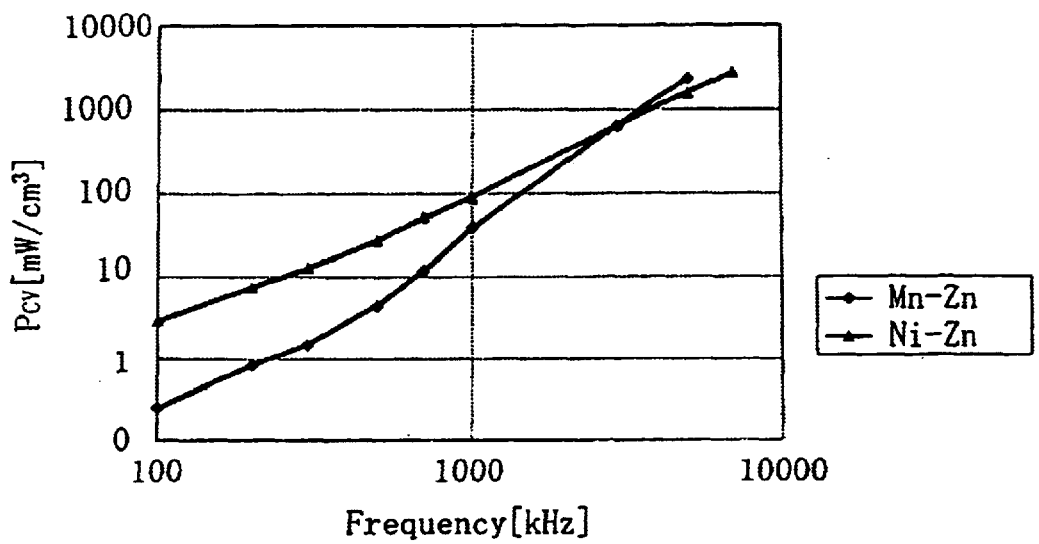
FIG. 8 is a graph showing the relationship between the loss and the frequency for a Mn—Zn ferrite and a Ni—Zn ferrite.
Figure 9:
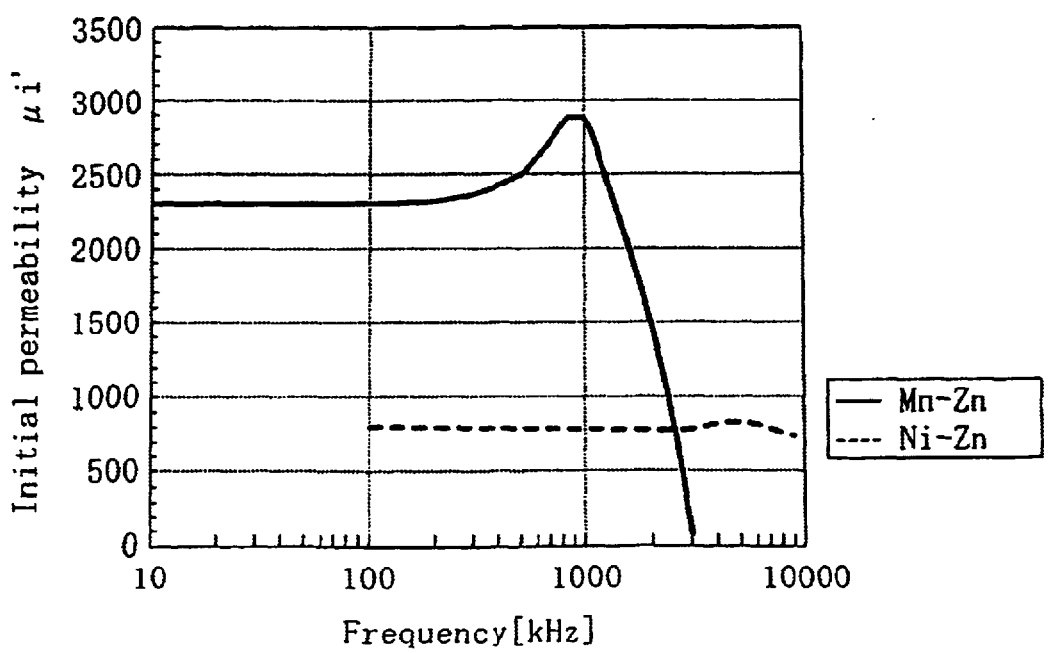
FIG. 9 is a graph showing the relationship between the initial permeability and the frequency for a Mn—Zn ferrite and a Ni—Zn ferrite.

First, prior to description of an embodiment of the present invention, ferrite materials will be discussed. Ferrite materials are roughly classified into Mn—Zn ferrite materials and Ni—Zn ferrite materials. FIG. 8 shows the frequency dependency of the loss (Pcv) per unit volume at a magnetic flux density of 10 mT for a Mn—Zn ferrite and a Ni—Zn ferrite. FIG. 9 shows the frequency dependency of the initial permeability for a Mn—Zn ferrite and a Ni—Zn ferrite.

As is found from FIG. 8, the loss is smaller as the frequency is lower for both the Mn—Zn ferrite and Ni—Zn ferrite materials, and the Mn—Zn ferrite is smaller in loss in the frequency range of 1 MHz or less. As shown in FIG. 9, the Mn—Zn ferrite is poor in permeability in a region of the high-frequency range exceeding 1 MHz. Therefore, in general, the Ni—Zn ferrite is preferably used in the high-frequency range exceeding 1 MHz. In the frequency range of 1 MHz or less, however, the Mn—Zn ferrite is smaller in loss and higher in initial permeability than the Ni—Zn ferrite. In addition, the initial permeability is kept stable for a wider range. Therefore, in this frequency range, it is generally preferable to use the Mn—Zn ferrite, not the Ni—Zn ferrite.

Figure 7:
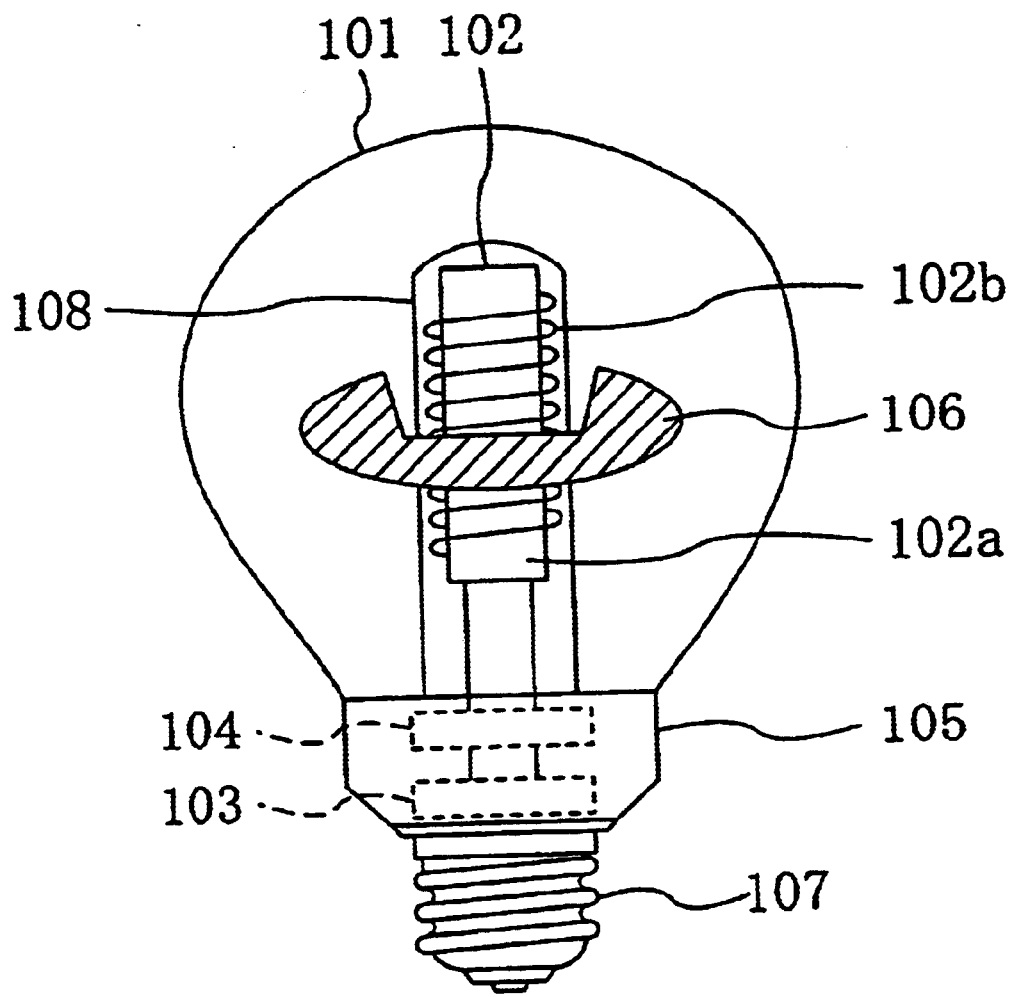
FIG. 7 is a view schematically illustrating a cross-sectional construction of a conventional illumination unit.

However, conventionally, it is not possible to use a Mn—Zn ferrite as the induction coil core 102a shown in FIG. 7 in a comparatively low frequency range of 1 MHz or less for the following reason. That is, the temperature of the Mn—Zn ferrite operated in the above frequency range exceeds its Curie temperature. This problem will be described as follows.

In the conventional illumination unit shown in FIG. 7, the magnetic flux at the induction coil 102 (that is, the magnetic flux passing the core 102a) required for generating and sustaining the discharge plasma 106 is larger as the operating frequency of the high-frequency power supply circuit 103 is lower. That is, the magnetic flux is roughly inversely proportional to the frequency. This is due to the fact that the plasma voltage is proportional to the product of the magnetic flux density and the frequency.

Therefore, while discharge can be initiated with small magnetic flux having a density of about several milli-tesla (mT) for operation with a frequency of several megahertz, very large magnetic flux is required for operation with a frequency of 1 MHz or less. This causes great increase of iron loss in the induction coil core 102a and thus raises the temperature of the core 102a. As a result, the temperature of the core 102a exceeds the Curie temperature, i.e., the limit temperature above which magnetism is no more exhibited. In this state, discharge can no more be sustained.

The Curie temperature of Mn—Zn ferrites conventionally researched and developed is about 200° C. at highest. The reason is as follows. In normal uses of Mn—Zn ferrites such as uses for choking coils and cores for transformers, the temperature of the ferrite rises to about 100° C. at highest during operation. Therefore, about 200° C. is adequately high as the Curie temperature of Mn—Zn ferrites for normal uses. Unlike such normal uses, however, when a Mn—Zn ferrite is operated at a comparatively low frequency of 1 MHz or less in the illumination unit shown in FIG. 7, the temperature of the ferrite rises to as high as above 250° C., for example. That is, in this case, the temperature of the ferrite exceeds the Curie temperature, resulting in failure to sustain the discharge. Conventionally, however, Mn—Zn ferrites of which the Curie temperature exceeds 250° C., for example, have never been developed because there has been no demand for such ferrites.

In order to overcome the conventional problem arising with high-frequency operation described before, the present inventors attempted to develop a Mn—Zn polycrystalline ferrite having a Curie temperature of 270° C. or more so that the ferrite can operate with a comparatively low frequency of 1 MHz or less (for example, 50 kHz to 1 MHz), and succeeded in producing a Mn—Zn polycrystalline ferrite having a Curie temperature of 270° C. or more. The present invention permits operation with a comparatively low frequency of 1 MHz or less and thus can overcome the conventional problem arising with high-frequency operation. Specifically, as a member constituting the high-frequency power supply circuit 103, an inexpensive general one available as an electronic component for general electronic equipment can be used. Also, the size of the member can be made small. As a result, both cost reduction and downsizing of the illumination unit are attained.

Hereinafter, an embodiment of the present invention will be described with reference to the relevant drawings. It should be noted that the present invention is not restricted to the embodiment described below.

Figure 1:
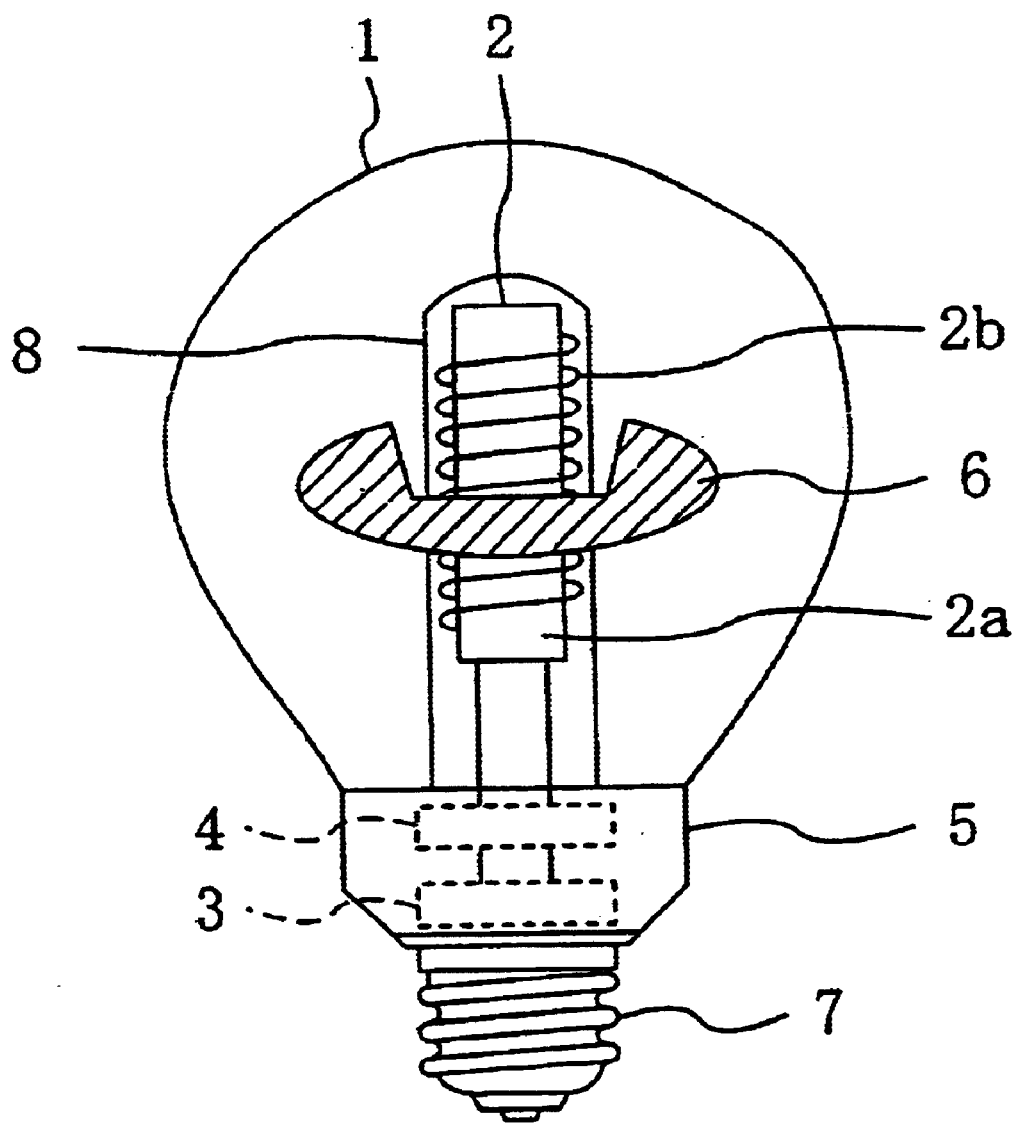
FIG. 1 is a view schematically illustrating a cross-sectional construction of an illumination unit of an embodiment of the present invention.

FIG. 1 schematically illustrates a cross-sectional construction of an illumination unit of the embodiment of the present invention. The illumination unit shown in FIG. 1 is an electrodeless lamp, i.e., a lamp having no electrode.

The illumination unit of this embodiment includes: a bulb 1; an induction coil 2 for generating an electromagnetic field inside the bulb 1; and a power supply 3 for supplying power to the induction coil 2. The bulb 1 contains discharge gas such as inert gas and metal vapor inside. The induction coil 2 generates an electromagnetic field with a frequency in the range of 50 kHz to 1 MHz inclusive in the bulb 1. The power supply 3 in this embodiment is a high-frequency power supply circuit, which is connected to a power line via a base 7. Power supplied through the power line is converted to power having a frequency in the range of 50 kHz to 1 MHz inclusive, for example, by means of a switching element in the high-frequency power supply circuit 3.

The high-frequency power supply circuit 3 is electrically connected to the induction coil 2 via a matching circuit 4. The matching circuit 4 functions to match the impedance between the high-frequency power supply circuit 3 and the induction coil 2 for efficient supply of power output from the high-frequency power supply circuit 3 to the induction coil 2. The induction coil 2 is essentially composed of a core 2a and a winding 2b. Once power is supplied from the high-frequency power supply circuit 3 to the induction coil 2, electromagnetic energy is induced inside the bulb 1 due to the electromagnetic field generated by the induction coil 2, causing generation of ring-shaped discharge plasma 6. Generation of the plasma discharge 6 causes emission of ultraviolet light or visible light, whereby light output is obtained.

In this embodiment, a phosphor is applied to the inner wall of the bulb 1, to thereby convert ultraviolet light to visible light. However, the present invention is not limited to this construction, but no phosphor may be applied to the inner wall of the bulb 1 depending on the use.

The bulb 1 has a cavity 8 formed roughly along the center axis of the bulb 1. The induction coil 2 is placed inside the cavity 8. In other words, a portion of the outer wall of the bulb 1 is deformed into a concave shape reaching the center of the bulb 1 to form the cavity 8, in which the induction coil 2 is placed so as to be in the vicinity of the bulb 1. The high-frequency power supply circuit 3 and the matching circuit 4 electrically connected to the induction coil 2 are housed in a circuit case 5. In this embodiment, the illumination unit is a self-ballasted fluorescent lamp integrally including the bulb 1 having the cavity 8 with the induction coil 2 placed therein, the circuit case 5, and the base 7.

The induction coil core 2a of the present invention is made of a Mn—Zn polycrystalline ferrite. The Mn—Zn polycrystalline ferrite constituting the core 2a has a Curie temperature ture of 270° C. or more. That is, a Mn—Zn ferrite of which the Curie temperature is 270° C. or more is used as the magnetic material constituting the core 2a. As used herein, the "Mn—Zn ferrite" is defined and understood as a material containing Fe, Mn, and Zn as main components other than oxygen and obtained by synthesizing and sintering oxides of Fe, Mn, and Zn, where the three elements occupies 90 wt. % or more, for example, of the composition excluding oxygen. Examples of main oxides (main raw material oxides) constituting the Mn—Zn ferrite include $Fe_2O_3$, MnO, and ZnO. In this embodiment, the composition includes, not only stoichiometric compounds, but also non-stoichiometric compounds. An additive in a trace amount may also be included in the ferrite in addition to the above oxides.

The reasons why the Mn—Zn ferrite is used are as follows. The iron loss in the Mn—Zn ferrite can be made smaller than that in the Ni—Zn ferrite in the frequency band of 50 kHz to 1 MHz inclusive (see FIG. 8). In addition, the initial permeability of the Mn—Zn ferrite is higher, as well as being stable for a wider frequency range, than that of the Ni—Zn ferrite (see FIG. 9). The polycrystalline ferrite is used as the Mn—Zn ferrite for the purpose of forming high resistance layers at grain boundaries of the sintered ferrite and thus suppressing loss due to an eddy current flowing the ferrite surface. A single-crystalline ferrite may also be used. However, in this case, a large eddy current flows the surface of the ferrite due to high conductivity of the ferrite, resulting in disadvantageously increasing the eddy-current loss.

The Mn—Zn ferrite of this embodiment has a very high Curie temperature of 270° C. or more. With this high Curie temperature, the discharge plasma 6 can be sustained even when the temperature of the core 2a rises in the operation in the frequency band of 50 kHz to 1 MHz. The Curie temperature of 270° C. or more is adequate as long as the illumination unit of this embodiment is lit at room temperature. However, in consideration of the case where the ambient temperature surrounding the illumination unit is higher than room temperature, the Curie temperature is preferably 290° C. or more. The Curie temperature is the limit temperature above which a substance no more exhibits magnetism. If exceeding this temperature, the magnetic material 2a loses magnetism, resulting in large decrease in inductance, decrease in magnetic flux generated in the bulb 1, and thus decay of the discharge plasma 6.

The Curie temperature of 270° C. or more is attained for the Mn—Zn ferrite of this embodiment based on concepts roughly grouped into two. One concept is increasing the iron content of the Mn—Zn ferrite. For example, this is realized by a Mn—Zn ferrite including Fe, Mn, and Zn where the proportion of Fe element is 72 wt. % or more in all elements excluding oxygen. The other concept is adding Ni element (NiO) to the Mn—Zn ferrite. For example, this is realized by a Mn—Zn ferrite including Fe, Mn, and Zn, and Ni as an additive. The reason why these compositions can attain the Curie temperature of 270° C. or more will be described later. The above compositions may also include another additive in a trace amount.

The upper limit of the Curie temperature of the Mn—Zn ferrite constituting the induction coil core 2a is not specified. In practice, however, the upper limit of the Curie temperature can be defined based on the temperature limit of an insulating coating of the winding 2b, not based on the temperature of the ferrite material. The temperature limit of the winding 2b depends on the temperature during operation. Therefore, as the temperature is higher, the life of the winding 2b is shorter. For example, when a discharge lamp having a life of 6000 hours, i.e., the life of a conventional self-ballasted fluorescent lamp, is to be produced, the temperature limit of the winding is about 280° C. in the case of using a winding material of heat resistance class H, the highest class. The discharge plasma 6 can be sustained as long as the induction coil core 2a is operable even when the input voltage to the high-frequency power supply circuit increases (even when the circuit is overloaded). In consideration of the above, 340° C. or so is adequate as the Curie temperature of the Mn—Zn ferrite including a design margin and the like. Accordingly, the Curie temperature of the Mn—Zn ferrite can be in the range of 270° C. (preferably 290° C.) to 340° C. inclusive.

The winding 2b of the induction coil 2 is made of copper, for example, and preferably a Litz wire for suppression of loss. A Litz wire is a composite wire formed by stranding fine wires and thus has a larger surface area than a single wire having the same thickness. Use of a Litz wire, therefore, minimizes increase of the loss due to the skin effect and the proximity effect that may arise between adjacent turns of the winding 2b. The effect of the induction coil core of this embodiment can also be obtained by using a single wire. In other words, it is possible to obtain the effect of sustaining the discharge plasma 6 by operating the coil in the frequency band of 50 kHz to 1 MHz inclusive using the winding 2b made of a single wire.

Figure 2:
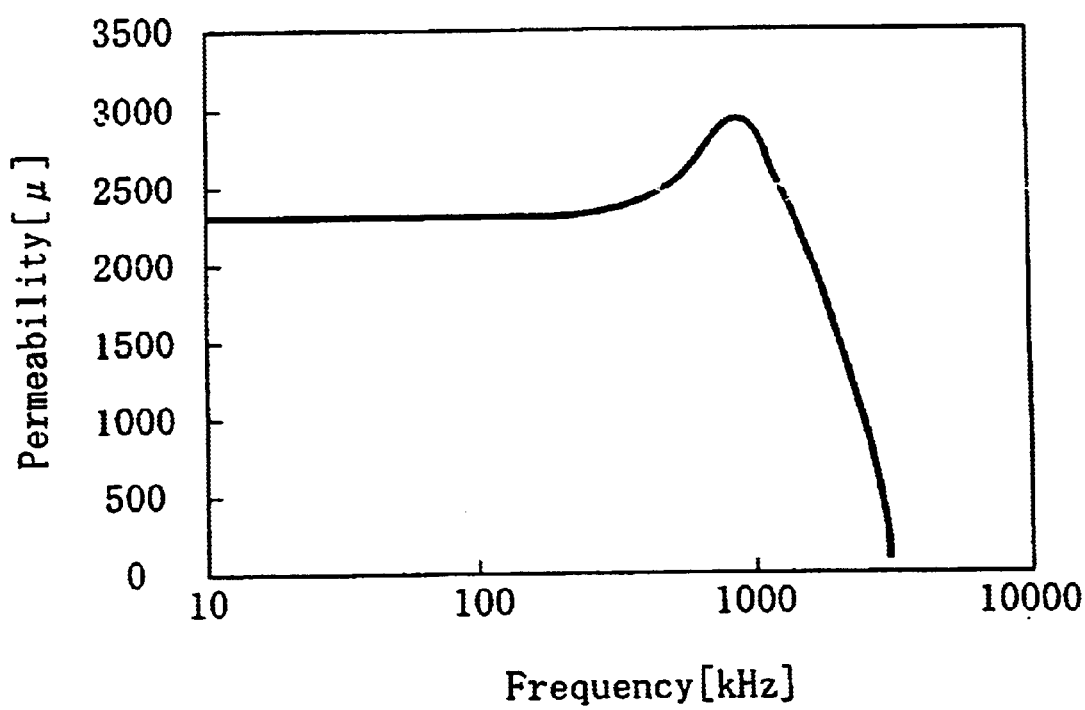
FIG. 2 is a graph showing the relationship between the initial permeability of an induction coil core 2a and the frequency in the embodiment of the present invention.

FIG. 2 shows the frequency dependency of the permeabilty $\mu$ of the Mn—Zn ferrite constituting the induction coil core 2a of this embodiment. The frequency [kHz] of the x-axis is presented in a logarithmic scale.

As is found from FIG. 2, when the frequency exceeds 1 MHz, the permeability of the Mn—Zn ferrite sharply drops. This drop is due to the physical properties of the Mn—Zn ferrite. Therefore, if the induction coil core 2a made of the Mn—Zn ferrite of this embodiment is used in the high frequency range exceeding 1 MHz, only an extremely weak electromagnetic field can be generated in the bulb 1. In order to attain effective generation and sustention of the plasma discharge charge 6, the frequency of power supplied to the core 2a is preferably set to 1 MHz or less. If the frequency is 50 kHz or less, however, loss in the induction coil 2 greatly increases. In order to facilitate discharge, therefore, the frequency of power supplied to the core 2a is preferably 50 kHz or more. In view of the above, the induction coil core 2a of this embodiment is preferably used in the frequency range of 50 kHz to 1 MHz inclusive. If the operating frequency of the high-frequency power supply circuit 3 is lowered, switching loss in a switching element of the high-frequency power supply circuit 3 decreases. This increases the powder conversion efficiency of the high-frequency power supply circuit 3. In consideration of this, the frequency is more preferably 500 kHz or less, for example.

The illumination unit of this embodiment does not use a radiating member for cooling the core 2a. On the contrary, the conventional illumination unit shown in FIG. 7 substantially necessitates provision of a radiating member for cooling the core 102a. Otherwise, the temperature of the core 102a will often exceed the Curie temperature. In this embodiment, the core 2a is made of a ferrite material having a Curie temperature of 270° C. or more. It is therefore possible to operate the illumination unit without provision of a radiating member for cooling the core 2a. In addition, in the conventional construction, the circuit case 105 is made of metal for increasing heat radiation. In this embodiment, the circuit case 5 may be made of, not only metal, but also other materials. It should be understood that in this embodiment a radiating member may be provided for further decreasing the temperature of the induction coil core 2a and that the circuit case 5 may be made of metal.

Next, the method for synthesizing the Mn—Zn ferrite material of this embodiment will be described. First, $Fe_3CO_3$, $MnCO_3$, and ZnO as main raw materials of the Mn—Zn ferrite material are mixed at a predetermined ratio and then calcinated. Since the characteristics of ferrite materials are greatly influenced by a trace amount of an additive, the above raw materials should preferably have a purity as high as 99.9% or more. In addition, to enhance the reactivity of the raw materials, the raw materials are desirably used in the form of fine powder having a mean particle size of 1 μm or less. Also, as a flux for further enhancing the reactivity of the raw materials, trace amounts of $V_2O_5$, $Bi_2O_3$, $B_2O_5$, $BaCl_2$, and the like may be mixed in some cases.

As trace elements, $SiO_2$, CaO, and the like may be added to the above raw materials in some cases, for the purpose of forming high resistance layers containing Si at grain boundaries of the sintered ferrite. This can suppress generation of an eddy current and thus suppress high frequency loss. The trace elements may remain in the synthesized ferrite material. However, the proportion of such trace elements in the composition is normally 2% or less, which is negligible compared with the amounts of the main raw materials.

Thereafter, the calcinated material is pulverized and granulated. The resultant material is then put in a cylindrical die, and sintered under application of a pressure. Finally, the surface is ground as required, to obtain the cylindrical Mn—Zn ferrite (induction coil core 2a) of this embodiment.

Figure 3:
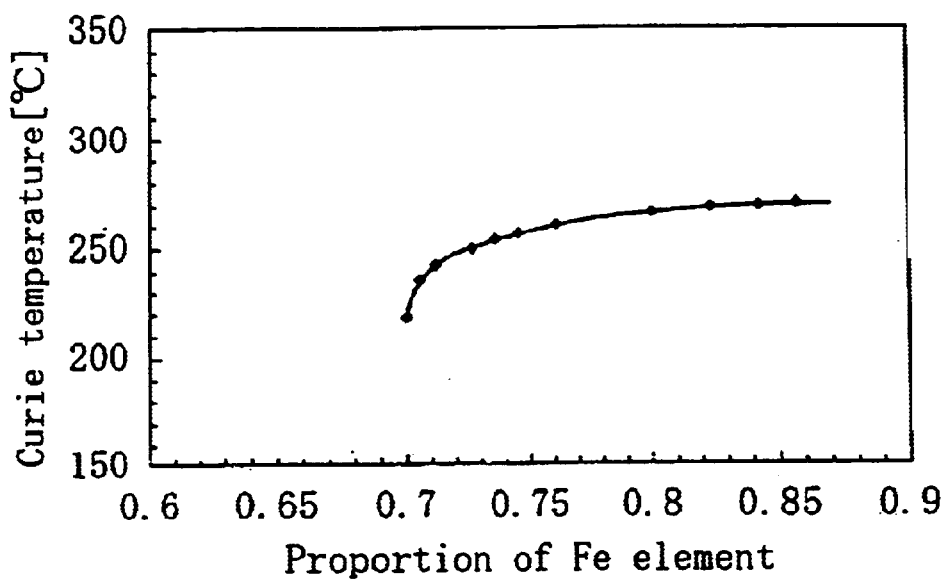
FIG. 3 is a graph showing the relationship between the proportion of Fe element and the Curie temperature.

In order to attain the Mn—Zn ferrite having a Curie temperature of 270° C. or more, the present inventors adopted a technique where the proportion of iron (ferric oxide) as one of the main components was increased. This is based on the idea of the present inventors as follows. The Curie temperature of ferric oxide is much higher than the Curie temperature of a general Mn—Zn ferrite. The Curie temperature of the Mn—Zn ferrite varies depending on the mixture ratio of the main components and existence of a trace amount of an additive. Accordingly, by increasing the proportion of iron (ferric oxide) as a main component, the nature of the Mn—Zn ferrite may be made closer to the nature of ferric oxide, and in this way the Curie temperature of the Mn—Zn ferrite may be more or less raised. Based on this idea, the present inventors increased the mixed amount of $Fe_2O_3$ in the mixture of $Fe_2O_3$, MnO, and ZnO for constituting the Mn—Zn ferrite while the mixed amounts of MnO and ZnO were fixed, and found that the Curie temperature of the resultant Mn—Zn ferrite exhibited tendency of increase. FIG. 3 shows a variation in Curie temperature with the mixed amount of $Fe_2O_3$. The x-axis of the graph of FIG. 3 represents the weight proportion of Fe element in all elements constituting the Mn—Zn ferrite excluding oxygen.

As is found from FIG. 3, as the proportion of Fe element is greater, the Curie temperature tends to rise. The present inventors confirmed that the Curie temperature of 270° C. or more was adequately obtainable if the proportion of Fe in all elements excluding oxygen was 72 wt. % or more, for example, provided that a trace amount of a rare earth element and the like was added. Also confirmed was that the Curie temperature of roughly 270° C. was possible for the Mn—Zn ferrite composed of only $Fe_2O_3$, MnO, and ZnO as the raw materials of the ferrite if the proportion of Fe was 84 wt. %, for example. The rise of the Curie temperature is substantially saturated when the proportion of Fe element exceeds 0.8 (80 wt. %), and thus the effect of the Curie temperature rise decreases. Contrarily, if the proportion of Fe element is too large, the nature of the resultant ferrite is excessively close to the nature of ferric oxide. That is, the permeability greatly decreases. For example, when the proportion of Fe element is 84 wt. %, the initial permeability decreases to one third of that obtained when the proportion of Fe element is 70 wt. %. In view of the above, the weight proportion of Fe element in all elements of the Mn—Zn ferrite excluding oxygen is preferably in the range of 72 wt. % to 84 wt. % inclusive.

In order to attain the Mn—Zn ferrite having a Curie temperature of 270° C. or more, the present inventors also adopted another technique where Ni element was added. This is due to the following idea of the present inventors.

As a type of ferrites other than the Mn—Zn ferrites, there exist Ni—Zn ferrites including Ni, Zn, and Fe as main raw materials. The Ni—Zn ferrites are low in permeability but can be synthesized to have a very high Curie temperature. The present inventors conceived an idea that by adding Ni element (NiO) to the composition of a Mn—Zn ferrite, the nature of the Mn—Zn ferrite might be made closer to the nature of the Ni—Zn ferrites, and in this way, the Curie temperature of the Mn—Zn ferrite might be raised. Based on this idea, the present inventors attained the Mn—Zn ferrite having a Curie temperature of 270° C. or more by adding NiO as an additive to the mixture of $Fe_2O_3$, MnO, and ZnO as the main raw materials of the Mn—Zn ferrite.

Figure 4:
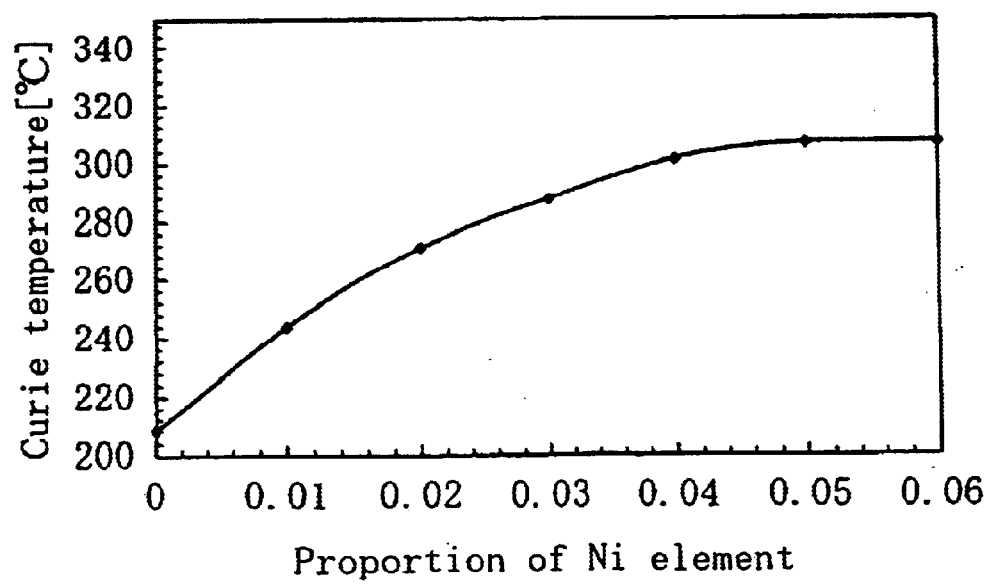
FIG. 4 is a graph showing the relationship between the proportion of Ni element and the Curie temperature.

FIG. 4 shows the effect of the addition of Ni element raising the Curie temperature of the Mn—Zn ferrite. In the graph of FIG. 4, the mixed amount of NiO was varied while the mixed amounts of $Fe_2O_3$, MnO, and ZnO for constituting the Mn—Zn ferrite were fixed. The x-axis of the graph represents the weight proportion of Ni element in all elements of the Mn—Zn ferrite excluding oxygen.

From FIG. 4, it is found that as the added amount of Ni element is greater, the Curie temperature rises. Also found is that the rise of the Curie temperature is great in the range of smaller added amounts of Ni element while it is small in the range of larger added amounts of Ni element. If the addition of Ni element is excessive, the characteristics of the Mn—Zn ferrite are too close to those of the Ni—Zn ferrite. That is, iron loss disadvantageously increases during operation in the frequency range of 50 kHz to 1 MHz inclusive. For example, when the added amount of Ni element excluding exceeded 6 wt. %, the loss characteristic of the core was too close to that of the Ni—Zn ferrite. The loss actually increased to an amount almost twice that of the conventional ferrite (Ni added amount: 0 wt. %). Therefore, the added amount of Ni element is preferably limited to within a predetermined range. Practically, it is desirably 6 wt. % or less, for example. In view of the above, the added amount of Ni element is preferably in the range of 1 wt. % to 6 wt. % inclusive. For example, it is preferably about 4 wt. %.

In the case of adding Ni element, the weight proportion of Fe element in all elements excluding oxygen can be about 60 wt. % or more, preferably about 70 wt. % or more. The Curie temperature of the Ni-added Mn—Zn ferrite may be further increased by adding a trace amount of a rare earth element and the like, or by increasing the proportion of Fe element.

The induction coil core 2a having a Curie temperature of 270° C. or more obtained by any of the above synthesis methods was tested under the conditions of room temperature, a frequency of 100 kHz, a magnetic flux density of 150 mT, and a cross-sectional area of a face normal to the longitudinal axis of the core 2a of 120 mm$^2$. As a result, it was found that a magnetomotive force of 600 ampere-turn could be applied to the core 2a. The fact that the magnetomotive force of 600 ampere-turn can be applied to the core 2a means that the core (magnetic material) 2a will not be saturated when it receives the magnetomotive force of 600 ampere-turn. Note that the direction of the magnetic flux generated inside the core 2a is in parallel with the longitudinal axis of the core 2a.

In the illumination unit shown in FIG. 1, if the core (magnetic material) 2a is saturated during startup, the inductance of the induction coil 2 decreases, resulting in failure in generation of magnetic flux required for the startup and thus failure in securing good startability. In view of this, the core 2a is preferably saturated less easily. For example, the magnetomotive force of 600 ampere-turn can desirably be applied to the core 2a under the conditions of room temperature, a frequency of 100 kHz, a magnetic flux density of 150 mT, and a cross-sectional area of a face normal to the longitudinal axis of the core 2a of 120 mm$^2$.

The Mn—Zn ferrite (Mn—Zn polycrystalline ferrite) of this embodiment has applications other than the use as the induction coil core 2a of the illumination unit shown in FIG. 1 as a matter of course. That is, the Mn—Zn ferrite of this embodiment can also be used as soft ferrites for transformers (coil transformers for communications, transformers for power supply, etc.), magnetic heads, deflection yokes, and the like, as well as various coils, taking advantage of its excellent thermal stability of having a high Curie temperature. From the viewpoint of taking advantage of the Curie temperature of 270° C. or more, the use of the ferrite as the induction coil core 2a of the illumination unit shown in FIG. 1 is considered especially suitable. The Mn—Zn ferrite may also include other substances such as a filler.

The embodiment of the present invention will be further described by way of example as follows.

EXAMPLE

The illumination unit having the construction shown in FIG. 1 was used. The frequency of the high-frequency power supply circuit 3 was set at 100 kHz. The size of the bulb 1 was 60 mm in diameter and 65 mm in height. Argon gas, 1.1 Torr (about 147 Pa), and mercury (3 mg/cc) were contained in the bulb 1. A phosphor was applied to the inner wall of the bulb 1. The size of the cavity 8 was 20 mm in diameter and 55 mm in height. The power consumption was 25 W. Main characteristics and sizes of materials used for the core 2a in this example are shown in Table 1 below.

TABLE 1

|  | (a) | (b) | (c) |
|---|---|---|---|
| Initial permeability | 2300 | 1800 | 1400 |
| Saturated magnetic flux density [mT] | 500 | 510 | 520 |
| Curie temperature [° C.] | 217 | 252 | 301 |
| Loss [mW/cm$^2$] (25° C., 100 kHz, 150 mT) | 230 | 290 | 380 |
| Inductance [µH] | 240 | 238 | 233 |
| Shape | Cylindrical | | |
| Size | ID φ 6.5 mm, OD φ 14 mm, height 50 mm | | |

Samples (a), (b), and (c) are all made of a Mn—Zn ferrite. Samples (a) and (b) are comparative examples, and sample (c) is the example of the present invention. Both comparative examples (a) and (b) have high Curie temperatures (more than 200° C.) that are not used in general use. As described before, the Mn—Zn ferrite includes Fe, Mn, and Zn as main components and is obtained by synthesizing and sintering oxides of Fe, Mn, and Zn. In all of samples (a), (b), and, (c), a polycrystalline ferrite was used to suppress loss due to an eddy current flowing the surface of the ferrite. In all of samples (a), (b), and (c), the winding 2b of the induction coil 2 was made of a Litz wire with 60 φ0.08 mm fine wires stranded together, and had a total of 60 turns in two layers of each 30 turns.

The illumination unit having the core 2a made of each of samples (a), (b), and (c) was lit, and the temperature at the highest temperature portion of the core 2a and the lighting retention state were examined. The results are shown in Table 2 below. The temperatures at the highest temperature portion in Table 2 indicate the highest temperature that reached before decay of the discharge plasma 6 for samples (a) and (b), and the highest temperature that reached before attainment of the thermally stable state for sample (c).

TABLE 2

|  | (a) | (b) | (c) |
|---|---|---|---|
| Highest temperature [° C.] | >220 | >255 | 270 |
| Lighting retained? | NO | NO | YES |

The temperature of the core 2a rises as the light remains on. When the temperature reaches the Curie temperature, the core 2a loses magnetism and thus the discharge plasma 6 decays. In samples (a) and (b) having a low Curie temperature, the temperature reached the Curie temperature in the midst of rise of the temperature at the highest temperature portion. On the contrary, in sample (c) having a high Curie temperature, the discharge was retained. As shown in Table 2, the highest temperature for sample (c) that succeeded in retaining the discharge plasma 6 reached 270° C. This indicates that the Curie temperature of the core 2a must be 270° C. at lowest when no heat radiation structure of any type is provided.

The core 2a used in this example has a frequency dependency of the permeability shown in FIG. 2. That is, the permeability of the core 2a sharply drops when the frequency exceeds 1 MHz. Therefore, if a high frequency exceeding 1 MHz or more is used, only an extremely weak magnetic field can be generated inside the bulb 1. This makes it difficult to generate and retain plasma discharge, and therefore such a high frequency is impractical. A frequency less than 50 kHz is also impractical because generation of discharge becomes quite difficult. In view of the above, the induction coil core 2a is preferably used with a frequency in the range of 50 kHz to 1 MHz inclusive.

As described above, the discharge plasma 6 can be generated and retained by using a polycrystalline ferrite having a Curie temperature of 270° C. or more as the core 2a in the illumination unit that operates with a frequency in the range of 50 kHz to 1 MHz inclusive.

In this example, the operating frequency of the high-frequency power supply circuit 3 is set at 100 kHz. Alternatively, any other frequency in the range of 50 kHz to 1 MHz inclusive may also be used. The illumination unit used in this example is of a bulb type where the base 7 is coupled to a power supply line. However, the effect described above is obtained irrespective of how the high-frequency power supply circuit 3 is connected to the power source line. In this example, the bulb 1 and the circuit case 5 are integrally coupled to each other. However, the effect described above can also be obtained in the case where these members are separated from each other. In this example, the outer diameter of the bulb 1 is 60 mm. It was found that the temperature of the core 2a scarcely changed with change of the diameter of the bulb 1. This indicates that the effect of the present invention can be obtained irrespective of the shape of the bulb 1.

As another comparative example, a Ni—Zn ferrite was used as the core 2a, and generation of discharge plasma was tested in the same illumination unit as that used in the above example. Main characteristics of the core 2a made of a Ni—Zn ferrite of this comparative example (sample (d)) are shown in Table 3 below. For reference, the characteristics of the core 2a made of a Mn—Zn ferrite of sample (a) described above are also shown in Table 3. As described before, the Ni—Zn ferrite includes Fe, Ni, and Zn as main components and is obtained by synthesizing and sintering oxides of Fe, Ni, and Zn. In sample (d), as in the above example, the winding was made of a Litz wire with 60 φ0.08 mm fine wires stranded together, and had a total of 60 turns in two layers of each 30 turns.

TABLE 3

|  | (a) | (d) |
| --- | --- | --- |
| Initial permeability | 2300 | 800 |
| Saturated magnetic flux density [mT] | 500 | 420 |
| Curie temperature [° C.] | 217 | ~200 |
| Loss [mW/cm$^2$] (25° C., 100 kHz, 150 mT) | 230 | 480 |
| Inductance [μH] | 240 | 217 |
| Shape | Cylindrical | |
| Size | ID φ 6.5 mm, OD φ 14 mm, height 50 mm | |

Figure 5:
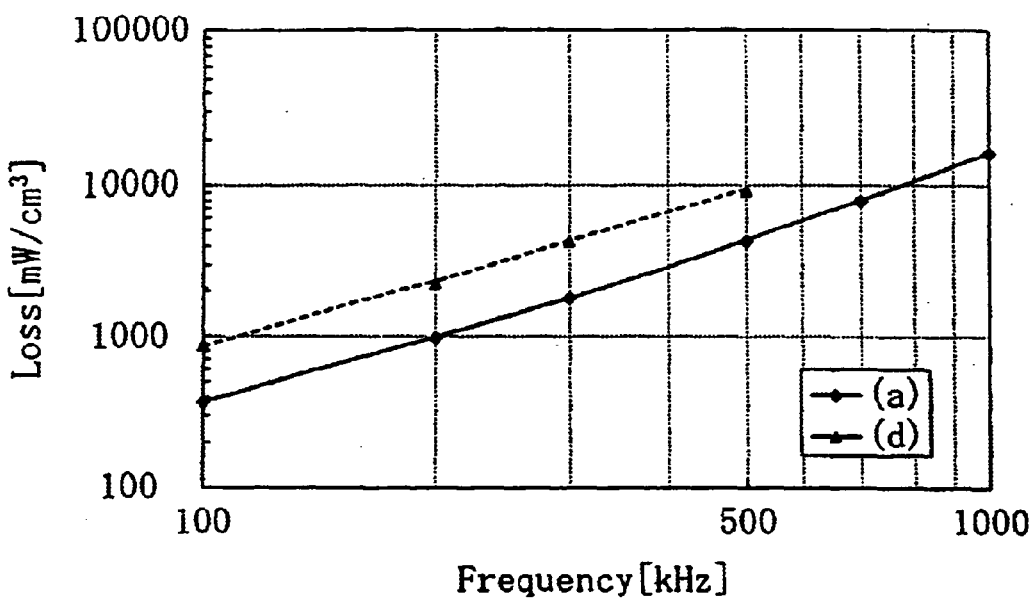
FIG. 5 is a graph showing the relationship between the loss and the frequency for samples (a) and (d).

As a result of the experiment, it was found that sample (d) failed to generate the discharge plasma 6. The reason is presumably that the core (d) had so large iron loss in the frequency band of 50 kHz to 1 MHz inclusive that it failed to provide power required for generation of the discharge plasma 6. For reference, the frequency dependencies of the loss in samples (a) and (d) are shown in FIG. 5. The measurement for this graph was made at 23° C. (room temperature) with a magnetic flux density of 150 mT.

As is found from FIG. 5, the core (d) of the comparative example was saturated at the frequency of 500 kHz or more, failing to generate magnetic flux of a density of 150 mT.

The reason why the magnetic flux density of 150 mT was selected as an evaluation condition of the core 2a is as follows. In the case of operation at a high frequency such as 3 MHz, discharge can be initiated with magnetic flux of a density as small as several milli-tesla. However, when the frequency is 1 MHz or less, very large magnetic flux is required. For example, when the frequency is 100 kHz, the magnetic flux density of about 150 mT is required. In other words, since the plasma voltage is proportional to the product of the magnetic flux density and the frequency, the magnetic flux required for generating the discharge plasma 6 is roughly inversely proportional to the frequency. For this reason, the large magnetic flux of a density of 150 mT is selected for the evaluation.

From the results shown in Table 3 and FIG. 5, it was found that in the frequency range of 1 MHz or less, the Ni—Zn ferrite core of sample (d) as the comparative example was not usable for the illumination unit of this example. This indicates that generation and retention of the discharge plasma 6 is only possible by using the Mn—Zn ferrite.

Next, the method for synthesizing the core 2a in this example will be described. First, powders of $Fe_2CO_3$, $MnCO_3$, $ZnO$, and $SiO_2$ as main components of the Mn—Zn ferrite material are quantified with a balance, mixed at a predetermined ratio, and calcinated. Normally, the above raw materials have a purity as high as 99.9% or more and are in the form of fine powder having a mean particle size of 1 μm or less. The component $SiO_2$ is a trace additive, which is added because it can form high resistance layers containing Si at grain boundaries of the sintered ferrite and thus can suppress high frequency loss.

The calcinated material is pulverized and granulated. The resultant material is then put in a cylindrical die, and sintered under application of a pressure. This pressurized sintering method is a widely accepted technique generally called hot pressing or hot isostatic pressing (HIP). Finally, the surface is ground as required, to obtain the cylindrical Mn—Zn ferrites used in the above example. The resultant trial-produced ferrite materials are all polycrystalline ferrites having a spinel crystal structure.

Next, the effect obtained by increasing the proportion of Fe atoms in the composition of the Mn Zn ferrite and the effect obtained by adding Ni element will be described. The compositions of samples (a), (b), and (c) are shown in Table 4 below. Table 4 also shows the composition of sample (e) that includes Fe element in the proportion of 72 wt. % or more (for example, 84 wt. %) in all elements excluding oxygen. Table 4 shows percentages by weight of respective elements in the Mn—Zn ferrite excluding oxygen, obtained by measuring the sintered samples semiquantitatively by X-ray fluorescence analysis. The Curie temperatures of samples (a), (b), (c), and (e) were 217° C., 252° C., 301° C., and 268° C., respectively.

TABLE 4

|  | (a) | (b) | (c) | (Unit: wt. %)<br>(e) |
|---|---|---|---|---|
| Fe | 70 | 71 | 68 | 84 |
| Mn | 20 | 21 | 19 | 11 |
| Zn | 10 | 7 | 8 | 5 |
| Ni | — | — | 4 | — |
| Al | — | 0.1 | — | — |
| Si | — | 0.1 | 0.1 | — |
| Cl | — | 0.2 | 0.3 | — |
| K | — | 0.1 | 0.1 | — |

It is generally known that the Curie temperature of the Mn—Zn ferrite material varies depending on the mixture ratio of the main components and existence of a trace additive. As is found from Table 4, samples (a) and (e) are Mn—Zn ferrites made of only $Fe_2O_3$, MnO, and ZnO. In comparison between samples (a) and (e), it is understood that the Curie temperature can be raised by increasing the proportion of Fe element in the composition. This is presumably because, as already described, with increase of the content of ferric oxide, the nature of the Mn—Zn ferrite is gradually closer to the nature of ferric oxide which has a significantly high Curie temperature. In addition, as is found from sample (b), the Curie temperature can further be increased by adding trace elements other than Fe, Mn, and Zn as the main components.

Moreover, as is found from sample (c), the Curie temperature can further be improved by adding Ni element. This is presumably because, as already described, by adding Ni element (NiO) to the composition of the Mn—Zn ferrite, the nature of the Mn—Zn ferrite is made more or less closer to the nature of the Ni—Zn ferrite and thus the feature of the Ni—Zn ferrite of having a high Curie temperature is imparted to the Mn—Zn ferrite.

The Curie temperature of the Mn—Zn ferrite can be effectively changed by changing the proportion of a trace additive such as Ni. However, if the content of the trace element is increased excessively to raise the Curie temperature, the initial permeability of the Mn—Zn ferrite (core 2a) will greatly decreases. Great decrease in initial permeability will reduce the magnitude of the electromagnetic field generated in the bulb 1, resulting in increasing the possibility of failure in generation of the discharge plasma 6. In consideration of the above, the following technique should preferably be adopted. That is, in the basic composition, the proportion of Fe element is set at 60 wt. % or more, preferably about 70 wt. % or more, so as to secure the magnetic material having a somewhat high Curie temperature by the effect obtained by increasing Fe element. Then, the Curie temperature is raised by adding a trace element. By this technique, a material having a high Curie temperature can be attained while minimizing reduction of the initial permeability.

As describe above, the ferrite material having a Curie temperature of 270° C. or more is desirably obtained by setting the proportion of Fe element in the Mn—Zn ferrite at 60 wt. % or more, preferably about 70 wt. % or more, and then adding a trace amount of Ni element to the resultant composition.

The present inventors examined the condition of the magnetomotive force for securing good startability. Specifically, the startability of the discharge plasma 6 in the illumination unit (FIG. 1) used in the above example was examined. In the examination, sample (c) in Table 4 was used as the core 2a. The core 2a was in the shape of a cylinder having a height of 50 mm and an inner diameter of φ6.5 mm as fixed values. By changing the outer diameter of the core 2a, the cross-sectional area of the core 2a required for securing good startability was examined.

In the test of startability at room temperature with a frequency of 100 kHz, a current of about 10 A flowed through the winding 2b having 60 turns during startup. That is, a magnetomotive force of 600 ampere-turn was applied to the core 2a during startup. If the core (magnetic material) 2a is saturated during startup, the inductance of the induction coil 2 decreases, resulting in failure in generation of magnetic flux required for the startup and thus failure in securing good startability. It is therefore important to ensure that the core (magnetic material) 2a will not be saturated with application of the magnetomotive force of 600 ampere-turn.

The cross-sectional area of the core 2a was changed by changing the outer diameter of the core 2a, to examine the DC superposition characteristic of the induction coil 2. Based on this examination, DC current values at which the inductance of the induction coil 2 decreased by 10% were plotted. The results are shown in FIG. 6.

Figure 6:
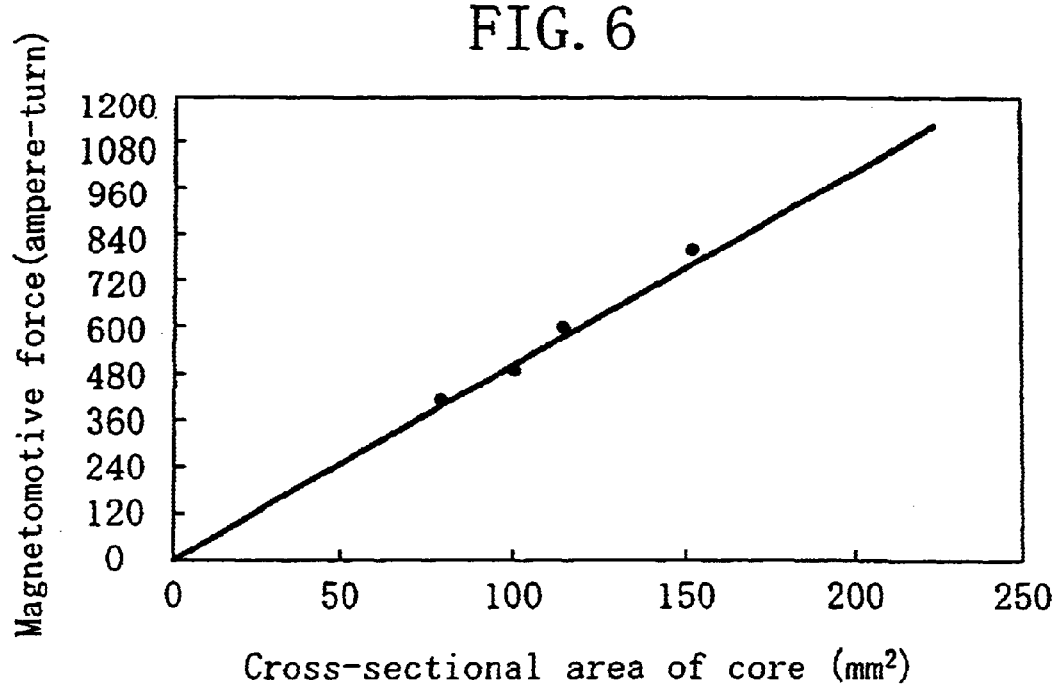
FIG. 6 is a graph showing the relationship between the cross-sectional area of the induction coil core 2a of the embodiment and the saturation current value.

As is found from FIG. 6, when the magnetomotive force of 600 ampere-turn is applied to the core 2a at room temperature with a frequency of 100 kHz, the cross-sectional area of the core 2a in which the inductance of the induction coil 2 decreases by 10% is 120 mm². In other words, the induction coil core 2a of this example has a nature that it is not saturated with application of the magnetomotive force of 600 ampere-turn at room temperature with a frequency of 100 kHz if it has a cross-sectional area of 120 mm².

There is sometimes a case where the temperature of the core 2a has reached around 270° C. during re-startup of the illumination unit. In general, the saturation flux density of the core (magnetic material) 2a tends to decrease with rise of the temperature. Therefore, the core 2a is more easily saturated at a temperature around 270° C. than at room temperature. In an actual illumination unit, therefore, it is desirable to slightly increase the cross-sectional area of the core 2a, so as to reduce the magnetic flux generated inside the core 2a when the same magnetomotive force is applied to the core 2a. With this measures, the core 2a will be further less easily saturated. less easily saturated.

The saturation condition of the core 2a during startup of the illumination unit is determined by the relationship between the cross-sectional area of a face vertical to the longitudinal axis of the core 2a and the magnetomotive force. This means that the same effect can be obtained irrespective of change in the length of the core 2a. The same effect is also obtained irrespective of change in the inner diameter of the core 2a. The nature of the core 2a described above is kept unchanged even when the shape of the bulb 1 and the number of turns of the winding 2b change. Therefore, the effect of the present invention is obtained irrespective of the number of turns and the outer diameter of the bulb 1.

Thus, according to the present invention, the induction coil core is made of a Mn—Zn polycrystalline ferrite having a Curie temperature of 270° C. or more. This makes it possible to provide an illumination unit capable of generating and retaining discharge plasma with a frequency in the range of 50 kHz to 1 MHz inclusive. When the induction coil core is made of a Mn—Zn polycrystalline ferrite having a Curie temperature of 290° C. or more, retention of plasma discharge is ensured even when the ambient temperature of the illumination unit rises. The Mn—Zn polycrystalline ferrite having a Curie temperature of 270° C. or more can be obtained by producing a ferrite including Fe, Mn, and Zn where the proportion of Fe element is 72 wt. % or more in all elements excluding oxygen. Such a Mn—Zn polycrystalline ferrite can also be obtained by producing a ferrite including Fe, Mn, and Zn and also including Ni as an additive. The magnetomotive force of 600 ampere-turn can be applied to the core under the conditions of room temperature, a frequency of 100 kHz, a magnetic flux density of 150 mT, and a cross-sectional area of a face of the core vertical to the direction of the magnetic flux of 120 mm$^2$. Under these conditions, therefore, the induction coil core is not saturated, and thus plasma discharge can be initiated and retained.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. An illumination unit comprising:

a bulb containing discharge gas inside;

an induction coil for generating an electromagnetic field with a frequency in a range of 50 kHz to 1 MHz is disposed in the bulb; and a power supply for supplying power to the induction coil, wherein the induction coil includes a core and a winding, and the core is made of a Mn—Zn polycrystalline ferrite and has a Curie temperature of 270° C. or more, and wherein the Mn—Zn polycrystalline ferrite includes an Ni element as an additive, the Ni element occupies 1 wt. % to 6 wt. % of all elements excluding oxygen in the Mn—Zn polycrystalline ferrite.

2. An illumination unit according to claim 1, wherein the Fe element occupies 60 wt. % or more of all elements excluding oxygen in the Mn—Zn polycrystalline ferrite.

3. An illumination unit according to claim 1, wherein the Curie temperature is 290° C. or more.

4. An illumination unit according to claim 1, wherein the induction coil has a characteristic of being able to receive a magnetomotive force of 600 ampere-turn or more under the conditions of room temperature, a frequency of 100 kHz in the electromagnetic field, and a cross-sectional area of a face of the coil vertical to a direction of magnetic flux of 120 mm$^2$.

5. An illumination unit according to claim 1, wherein the induction coil is placed in a cavity in the center of the bulb formed by deforming a portion of an outer wall of the bulb into a concave shape, a phosphor is applied to an inner wall of the bulb, and the discharge gas includes at least rare gas.

6. An illumination unit according to claim 5, wherein the illumination unit is a self-ballasted fluorescent lamp.

* * * * *